US010551522B2

(12) United States Patent
Donderici et al.

(10) Patent No.: US 10,551,522 B2
(45) Date of Patent: *Feb. 4, 2020

(54) WORKFLOW ADJUSTMENT METHODS AND SYSTEMS FOR LOGGING OPERATIONS

(71) Applicant: Halliburton Energy Services, Inc., Houston, TX (US)

(72) Inventors: Burkay Donderici, Houston, TX (US); Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,192

(22) Filed: Dec. 5, 2018

(65) Prior Publication Data

US 2019/0113651 A1    Apr. 18, 2019

Related U.S. Application Data

(63) Continuation of application No. 15/021,029, filed as application No. PCT/US2013/061757 on Sep. 25, 2013, now Pat. No. 10,180,514.

(51) Int. Cl.
*G01V 3/38* (2006.01)
*G01V 3/12* (2006.01)

(52) U.S. Cl.
CPC . *G01V 3/38* (2013.01); *G01V 3/12* (2013.01)

(58) Field of Classification Search
CPC .................................. G01V 3/38; G01V 3/12
See application file for complete search history.

(56) References Cited

U.S. PATENT DOCUMENTS

| 4,329,647 A * | 5/1982 | Freedman ............... E21B 47/02 324/323 |
| 6,233,524 B1 | 5/2001 | Harrell et al. |
| 7,800,372 B2 | 9/2010 | Peter et al. |

(Continued)

FOREIGN PATENT DOCUMENTS

| JP | 2001083261 A | 3/2001 |
| RU | 2475645 C2 | 2/2013 |

(Continued)

*Primary Examiner* — Mamadou L Diallo
(74) *Attorney, Agent, or Firm* — Jason Sedano; Parker Justiss, P.C.

(57) ABSTRACT

In an embodiment a method of automatic adjustment of logging, processing, inversion, and visualization operations is disclosed. The method comprises gathering data about formation properties in a database, filtering the gathered data, generating rules based on the filtered data, and providing automatic adjustments to automatically adjust the logging, processing, inversion, and visualization operations. The gathered data includes a plurality of in-well measurement points and a plurality of wells in a given geological area. A quality factor is derived based on a difference between the automatic adjustments and parameters that an operator communicates as a best parameter. The quality factor is used to determine which of the gathered data is to be stored in the database. The rules are applied to a next iteration of data that is to be gathered. The method repeats until no further improvement is obtained.

13 Claims, 8 Drawing Sheets

(56) References Cited

U.S. PATENT DOCUMENTS

| | | | |
|---|---|---|---|
| 7,999,695 B2 | 8/2011 | Rodney et al. | |
| 9,507,047 B1* | 11/2016 | Dvorkin | G01V 5/101 |
| 2004/0020653 A1 | 2/2004 | Smith | |
| 2008/0247273 A1 | 10/2008 | Chemali | |
| 2009/0230295 A1* | 9/2009 | Waring | E21B 47/1015 |
| | | | 250/260 |
| 2010/0125439 A1 | 5/2010 | Reiderman et al. | |
| 2010/0133008 A1 | 6/2010 | Gawski et al. | |
| 2010/0147510 A1* | 6/2010 | Kwok | G01V 11/00 |
| | | | 166/250.01 |
| 2012/0186873 A1 | 7/2012 | Shayegi et al. | |
| 2013/0113480 A1* | 5/2013 | Kadayam Viswanathan | |
| | | | G01V 3/32 |
| | | | 342/303 |
| 2013/0124176 A1 | 5/2013 | Fox et al. | |
| 2014/0100785 A1* | 4/2014 | Sloan | G01T 7/005 |
| | | | 702/8 |
| 2017/0321486 A1* | 11/2017 | Faircloth | E21B 7/15 |

FOREIGN PATENT DOCUMENTS

| | | |
|---|---|---|
| SU | 1448034 A1 | 12/1988 |
| WO | 2015047256 A1 | 4/2015 |

* cited by examiner

ACQUIRE MEASUREMENT DATA RELATED TO A FORMATION

ADJUST A CONTROL PARAMETER FOR ONGOING LOGGING OPERATIONS BASED ON AT LEAST SOME OF THE MEASUREMENT DATA AND AN ADAPTIVE LEARNING ENGINE EMPLOYED BY THE LOGGING TOOL

WORKFLOW ADJUSTMENT METHODS AND SYSTEMS FOR LOGGING OPERATIONS

CROSS-REFERENCE TO RELATED APPLICATION

This application is a continuation of U.S. application Ser. No. 15/021,029, filed by Burkay Donderici, et al. on Mar. 10, 2016, entitled "WORDFLOW ADJUSTMENT METHODS AND SYSTEMS FOR LOGGING OPERATIONS." U.S. application Ser. No. 15/021,029 is a U.S.C. § 371 National Stage Entry of International Application No. PCT/US2013/061757, filed by Burkay Donderici, et al. on Sep. 25, 2013, entitled "WORKFLOW ADJUSTMENT METHODS AND SYSTEMS FOR LOGGING OPERATIONS." Both applications are commonly assigned with the present invention and are incorporated herein by reference as reproduced herein in their entirety.

BACKGROUND

Understanding the structure and properties of geological formations can improve the efficiency of oil field operations such as drilling, well completion, and production. In the past, properties of such formations have been estimated, modeled or predicted prior to drilling into the formation. However, the actual properties of a particular part of a formation are typically not known until after a drill bit drills into that part of the formation. Thus, drilling operators in those circumstances cannot effectively make proactive or preemptive decisions based on advance knowledge of the actual properties of the formation prior to the drill bit cutting into the formation. Management of ongoing logging-while-drilling (LWD) or wireline logging operations is not a trivial task and is affected by factors including communication bandwidth limitations between a downhole tool and a surface control system, measurement accuracy limitations, data processing limitations, and data interpretation limitations.

BRIEF DESCRIPTION OF THE DRAWINGS

Accordingly, there are disclosed herein various workflow adjustment methods and systems for providing ongoing logging operations.

DETAILED DESCRIPTION

Disclosed herein are methods and systems for logging workflow management using an adaptive learning engine employed downhole and/or at the surface. The operations of the adaptive learning engine may be based on collected measurements, operator inputs, and/or automation rules. The logging workflow management techniques described herein are applied to ongoing logging operations. As used herein, "ongoing logging operations" refer to a sequence of logging operations in a borehole. For each step in the sequence of logging operations, the logging workflow may be adjusted. Such adjustments may approach real-time adjustments, but are not limited thereto.

Figure 1:
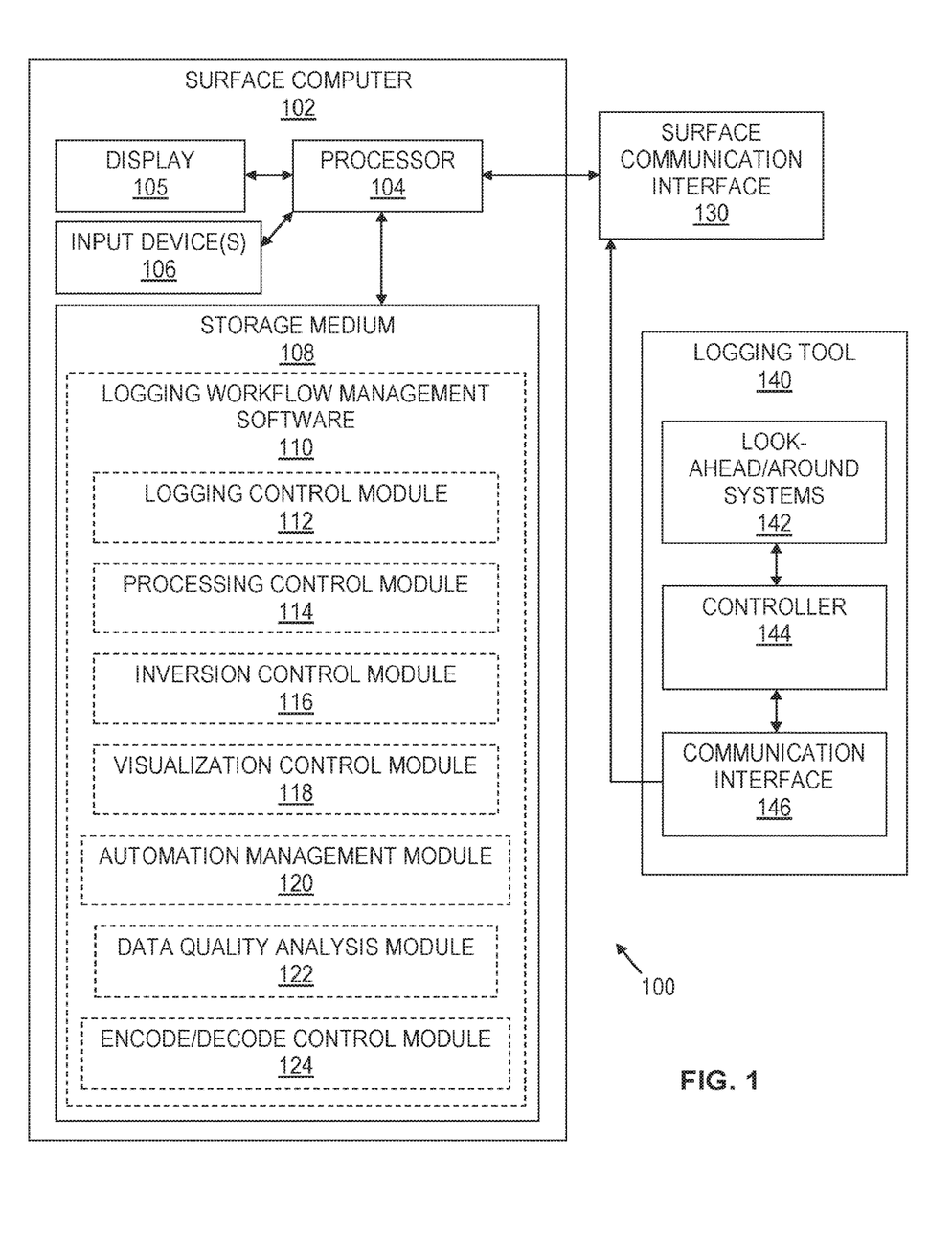
FIG. 1 shows a block diagram of an illustrative logging system.

FIG. 1 shows a block diagram of an illustrative logging system 100. The logging system 100 includes a logging tool 140 with look-ahead/around systems 142 to collect ahead of bit and/or around bit measurements. As used herein, "ahead of bit measurements" refer to measurements corresponding to regions that are in front of a drill bit or reference point associated with the drill bit. Meanwhile, "around bit measurements" refer to measurements corresponding to regions that are to the side of a drill bit or reference point associated with the drill bit.

The logging tool 140 also includes a controller 144 to direct various operations of the logging tool 140. The operations include setting or adjusting parameters for collecting raw data, processing the raw data, storing the raw and/or processed data, and transmitting the raw and/or processed data to the surface. A communication interface 146 of the logging tool 140 enables ahead of bit and/or around bit measurement data to be transferred to a surface communication interface 130. The surface communication interface 130 provides the ahead of bit and/or around bit measurement data to a surface computer 102 using known telemetry techniques (e.g., mud pulse, electromagnetic signaling, or a wired pipe arrangement). It should be understood that the ahead of bit and/or around bit measurement data provided to the surface computer 102 from the logging tool 140 may include raw measurement data, processed measurement data, inverted measurement data, and/or visualization parameters.

As shown in FIG. 1, the surface computer 102 includes a processor 104 coupled to a display 105, input device(s) 106, and a storage medium 108. The display 105 and input device(s) 106 function as a user interface that enables an operator (i.e., a drilling operator and/or logging operator) to view information, to input steering commands, and/or to input logging workflow commands or values.

In at least some embodiments, the storage medium 108 stores a logging workflow management software 110 with a logging control module 112, a processing control module 114, an inversion control module 116, a visualization control module 118, an automation management module 120, a data quality analysis module 122, and an encode/decode control module 124. In at least some embodiments, the operations of the logging workflow management software 110 are based at least in part on generating a visual representation of the formation from acquired measurement data, and receiving feedback from an operator. As an example, operator feedback may correspond to an operator selecting from available workflow control options, providing data quality analysis, and/or establishing rules to enable workflow automation for ongoing logging operations.

In some embodiments, the input device(s) 106 include a touch screen, mouse, and/or keyboard to enable an operator to interact with the logging workflow management software 110. Further, the input device(s) 106 may enable an operator to interact with a steering interface that assists the operator with steering decisions using visual representations of a formation as described herein. It should be understood that the operations of the logging workflow management software 110 apply to wireline logging systems as well as LWD systems.

In at least some embodiments, the logging control module 112 of the logging workflow management software 110 enables selection or adjustment of logging control parameters for ongoing logging operations. Example logging control parameters include a movement rate parameter (e.g., fixed or multiple variable rates), a source signal power level parameter, a source signal frequency parameter, an averaging window length parameter, an antenna orientation parameter, and/or a synthetic antenna orientation parameter.

More specifically, a source signal power level parameter may be associated with various tools such as an electromagnetic resistivity logging tool, an acoustic formation evaluation tool, a magnetic resonance tool, an acoustic caliper, a ranging tool, a look-ahead/look-around resistivity tool, a look-ahead/look-around acoustic tool, a pulsed neutron source, or an X-ray source derived from an electron beam. Frequency parameters may be associated with all forms of electromagnetic (including magnetic resonance) and acoustic tools, including ranging and look-ahead/look-around tools. Averaging window parameters typically relate to nuclear sensors, although these may be used in the detection of weak electromagnetic or acoustic signals as well (e.g., in look-ahead/look-around tools or ranging tools).

Example antenna parameters enable the selection of specific antennas or acoustic transducers (or groups of antennas or acoustic transducers) in an array of antennas or acoustic transducers. Further, antenna parameters may enable adjustments to the phase delay between antennas or acoustic transducers. Antenna parameters may also enable adjustments to the sensitivity or gain of antennas or acoustic transducers. Meanwhile, antenna orientation parameters enable adjustments to the orientation of the principal response axis of an antenna or acoustic transducer relative to the local axis of the drillstring and/or relative to each other. Antenna orientation parameters may also enable adjustments to the relative azimuthal positioning of antennas or acoustic transducers with respect to each other. In some embodiments, such antenna orientation parameters are associated with LWD systems, while other parameters are associated with LWD and wireline systems.

The processing control module 114 enables selection or adjustment of data processing control parameters for ongoing logging operations. Example data processing control parameters include a multi-component synthesis parameter, a different tilt angle synthesis parameter, a delayed virtual antenna element parameter, a noise filtering parameter, a trigonometric-filtering parameter, a temperature correction parameter, a software focusing parameter, a polarization horn effect removal parameter, a borehole correction parameter, and a calibration parameter.

The inversion control module 116 enables selection or adjustment of data inversion control parameters for ongoing logging operations. Example data inversion control parameters include an inversion type parameter, an inversion frequency parameter, and an inversion averaging parameter. Example inversion control parameters include: initial estimate of distance to a boundary, inversion search range limits, initial estimates of formation resistivities above and below a boundary, initial estimates of densities above and below a boundary, initial estimates of invaded zone diameter and resistivity, initial estimates of bed dip and anisotropy, (and bounds on the ranges of these variables), the selection of specific algorithms (e.g., the selection of a mixing law for a given formation type). A mixing law describes how the bulk physical properties of a composite material vary as a function of the properties and distribution of its constituent materials. Such mixing laws are typically semi-empirical in nature and have a validity that is formation-dependent).

Inversion type parameters are mainly associated with the parameterization of the formation geometry and unknowns. An example inversion type parameter value is zero-dimensional, where a homogeneous formation model is assumed. Another inversion type parameter value is one-dimensional, where formation property variations are assumed to be only in one spatial dimension. Another inversion type parameter value is two-dimensional, where only formation property variations in two spatial dimensions are considered. Another inversion type parameter value is three-dimensional, where formation property variations are present in all three spatial dimensions. Here dimensions can be considered to be in rectangular, cylindrical, elliptical, or spherical coordinate systems. Inversion type parameters may also enable a choice between an iterative algorithm versus an algorithm based on inversion table look-up. For inversion table look-up, a pre-computed table that maps outputs to input parameters of the forward problem (e.g., a casual linear time-invariant system such as the solution of signal values given a certain formation property distribution and tool design) is considered. Inversion type parameter may also enable selection of the numerical optimization algorithm that is being used (e.g., steepest decent, conjugate gradient, Levenberg-Marquardt, and Gauss Newton).

Inversion frequency parameters may include a set of indices that indicate which frequencies are going to be used in the inversion. Inversion frequency parameters also may be the frequencies themselves. Inversion averaging parameters may define how many depth input data points will be included in the inversion and/or the distribution of weights. Additionally or alternatively, inversion averaging parameters may define how many points or layers will be included in the output parameterization of an inversion problem.

The visualization control module 118 enables selection or adjustment of visualization control parameters for ongoing logging operations. Example visualization control parameters include a map view type parameter, and map view option parameters.

Without limitation, the parameters that are displayed or represented by the visualization control module 118 may include physical parameters such as tool orientation, formation resistivity values, vertical resistivity, horizontal resistivity, relative dip angles, relative azimuth angles, bed dips, bed azimuths, drill path, distance to bed boundaries, water saturation, and formation porosity. In addition, trust parameters such as uncertainty estimates, inversion type information, and/or comparison information may be displayed or represented by the visualization control module 118. By displaying or representing physical parameters and trust parameters, the visualization control module 118 enables an LWD operator to provide input for logging workflow management and/or adaptive learning engine rules as described herein.

Example map view options include various two-dimensional (2D) or three-dimensional (3D) data plot options in which tool position/orientation and formation properties (e.g., resistivity or electromagnetic permeability) are represented by colors, patterns, and/or shapes. Particular formation materials also may be identified by colors, patterns, and/or shapes. In some embodiments, the patterns or shapes used to represent formation properties have a default appearance to represent isotropic formation properties and a scaled appearance (relative to the default appearance) to represent anisotropic formation properties. The 2D/3D data plot options may include use of arrows, lines, and/or strips to represent directions and distances (e.g., the direction and distance between the drill bit and a bed boundary). The 2D/3D data plot options also may include an uncertainty estimate for the data being displayed or represented. In some embodiments, uncertainty is represented by varying the transparency of data being displayed (higher transparency representing higher uncertainty), varying the shade of data being displayed, or by displaying an area of uncertainty for data being displayed. The 2D/3D data plot options also may include displaying data corresponding to different inversions along with inversion identifiers. The 2D/3D data plot options also may include wrapping plotted data that extends beyond map view boundaries. The 2D/3D data plot options also may include radar style plots to show the distance and direction between bed boundaries and the drill bit.

In some embodiments, displaying a map view includes displaying a 2D map view showing formation properties in a single predetermined direction with respect to a reference point for the tool as a function of depth. Additionally or alternatively, displaying a map view includes displaying a 2D or 3D map view showing a drill path and at least one separate 2D or 3D drill path object for each of a plurality of distinct depth values along the drill path. Additionally or alternatively, displaying a map view includes displaying a 2D map view showing a separate distance to bed boundary indicator for each of a plurality of distinct depth values. Additionally or alternatively, displaying a map view includes displaying a radar map view showing a tool reference point and concentric circles around the tool reference point to represent distance from the tool reference point, where the radar map view displays formation property objects as a function of azimuth with respect to an axis for the tool. The formation property objects may be boundary lines and/or formation information such as resistivity or electromagnetic permeability. Additionally or alternatively, displaying a map view includes displaying a map view showing a drill path and bed boundaries as a function of depth and horizontal position, where the map view wraps the horizontal position of the displayed drill path to an opposite side of the map view when a horizontal length of the drill path exceeds a horizontal position range of the map view. In different map views, different map features may be enabled or disabled.

The automation management module 120 enables selection or adjustment of adaptive learning engine rules for ongoing logging operations. Example adaptive learning engine rules include rules for selecting or adjusting the logging control parameters, the processing control parameters, and/or the inversion control parameters described according to predetermined programming, measurements, and/or triggers. In at least some embodiments, the automation management module 120 establishes rules using database information such as raw measurement data, processed measurement data, inverted measurement data, and/or visualization parameters. Further, manual feedback regarding the quality of raw measurement data, processed measurement data, inverted measurement data, and/or visualization parameters may be considered to establish adaptive learning engine rules. Further, a data filtration process such as a neural network procedure and/or multi-dimensional interpolation/extrapolation procedure may be applied to establish adaptive learning engine rules.

The data quality analysis module 122 provides a user interface to enable an operator to select or input a data quality value for raw measurement data, processed measurement data, inverted measurement data, and/or visualization parameters. In at least some embodiments, the feedback provided by an operator using the data quality analysis module 122 is employed by other modules of the logging workflow management software 110. For example, the automation control module 120 may use such feedback, at least in part, to establish adaptive learning engine rules as described herein at least at FIG. 12.

The encode/decode control module 124 enables selection or adjustment of encode/decode schemes to control data transmissions for ongoing logging operations. The different encode/decode schemes determine how much of multiples types of raw measurement data are transmitted from the logging tool 140 to surface computer 102 during the ongoing logging operations. Further, different encode/decode schemes are related to the amount of processing applied to multiples types of raw measurement data by the logging tool 140 and/or the surface computer 102. Further, different encode/decode schemes determine how much of multiple types of processed measurement data are transmitted from the logging tool 140 to the surface computer 102 during ongoing logging operations. A particular encode/decode scheme may be selected or updated, for example, in response to an operator reviewing the quality of different data types and determining that a different set of data types or a different amount of a particular data type is needed. Further, an adaptive learning engine may select a particular encode/decode scheme based on programming, measurements, and/or triggers.

Example workflow management operations performed using an adaptive learning engine and/or operator input include modifying the frequency, the power level, and/or selecting a different combination of transmitter and receiver in response to a sensor output being outside of the range within which it has an accurate response. As a specific example, in a high resistivity formation, a propagating wave resistivity phase-shift between two receiving antennas may be so small that a reliable measurement of resistivity cannot be made using the received value. In such case, a wider antenna spacing can be selected and/or a higher frequency. As another example, the center frequency of the transmitter could be shifted (e.g., a higher frequency in this particular example) in response to observing that a particular mode (e.g., a Stonely mode) is dominating the response. Further, different propagation modes may be established by using moveout among transducers, as well as various time/frequency processing techniques.

As another example of workflow management operations, all raw and processed data associated with a frequency may be transmitted or received with a lower precision and/or a lower data rate in response to inversion and interpretation results being insensitive to that frequency. As yet another example, if no significant changes in a signal are expected with respect to depth, an encoding scheme based on differencing with respect to depth may be selected to optimize bandwidth. As yet another example, if there are significant correlations between some of the raw or processed data channels, a multi-dimensional encoding/decoding scheme can be used to optimize bandwidth.

In another example, variations of raw or processed signals can be computed and compared to a threshold. If the variations are lower than the threshold, a differential encoding/decoding can be activated. As yet another example, correlations between different channels of raw or processed data can be computed and compared to a threshold. If the correlations are higher than a threshold, a 2D encoding/decoding scheme can be activated.

In at least some embodiments, the logging workflow management software 110 enables various manual or automated adjustments based on predetermined criteria. As an example, the drilling speed (including start/stop) or mud weight may be adjusted in response to determining that the resistivity of a formation layer is smaller than a threshold value (e.g., indicative of an unstable pressure zone), or is larger than threshold value (e.g., indicative of a salt dome). As another example, the power level at a particular frequency for a logging operation may be increased in response to determining that the inversion quality at a particular frequency is below a threshold level. Further, the frequency used for a logging operation may be reduced in response to determining that the inverted bed resistivity is below a threshold level. Further, the frequency used for a logging operation may be increased in response to determining that the inverted bed resistivity is above a threshold level. Further, longer measurements (with more averaging) may be performed in response to determining that a noise level is above a threshold level. Further, a synthetic antenna orientation may be adjusted to optimize the sensitivity ahead of the tool in response to determining a tool dip angle or orientation. Further, a reduced transmitter/receiver spacing may be selected in response to determining that the estimated distance to a boundary is less than a threshold level. Further, inversion results may be used as initial guesses for a next measurement if data quality is determined to be above a threshold level. Otherwise, inversion results may be discarded. Further, a learning algorithm or process may be stopped in response to determining that an anomalous condition exists (learning incorrect behavior is avoided). Further, a learning algorithm or process can be reset or set into a different mode in response to determining that a new environment is encountered.

Example adaptive learning engine rules or algorithms may be conditional statements that are executed when a specified condition becomes true. These rules or algorithms can be adjusted based on the results from previous measurements and/or information obtained from other tools or wells. Alternatively, rules or algorithms can be set up such that the parameters will be determined based on the measurements that are made. For example, the power level for a particular frequency during logging operations may be made inversely proportional to an inversion quality estimate. Further, a particular frequency may be lowered or increased during logging operations until a maximum absolute signal level or signal-to-noise ratio (SNR) is achieved. Further, the measurement window length may be adjusted iteratively during logging operations to produce a desired SNR level within a tolerance level.

Although FIG. 1 shows the logging workflow management tool 110 is stored and executed by the surface computer 102, it should be understood that related software may be executed by the logging tool 140 to perform various logging workflow management operations described herein. For example, in at least some embodiments, the controller 144 of the logging tool 140 includes software corresponding to the various modules described for the logging workflow management tool 110 to direct at least some of the logging control parameters, processing control parameters, inversion control parameters, visualization parameters, automation management, data quality analysis, and encode/decode schemes as described herein.

The discussion of ahead of bit and/or around bit measurement data is applicable to logging-while-drilling (LWD) embodiments of the logging system 100. For wireline logging embodiments of the logging system 100, the look-ahead/around systems 142 of the logging tool 140 are still relevant, but the point of reference would be part of the wireline tool rather than a drill bit as in LWD embodiments. Further, it should be understood that LWD or wireline embodiments of the logging system 100 may employ multiple logging tools, each with their own point of reference for look-ahead or look-around logging operations.

Figure 2A:
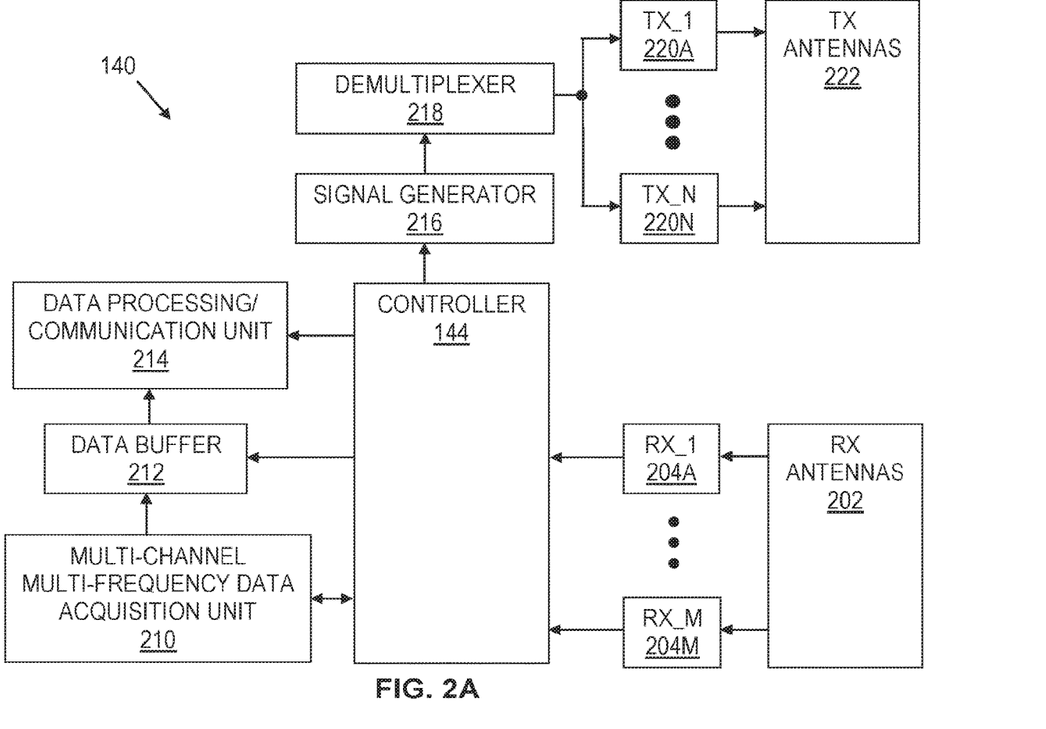
FIG. 2A shows a block diagram of illustrative components of a logging tool.

FIG. 2A shows a block diagram of illustrative induction or EM propagation logging tool 140. As shown in FIG. 2A, the logging tool 140 comprises the controller 144 in communication with various other components. More specifically, the logging tool 140 includes N transmitters 220A-220N with corresponding antennas 222 and M receivers 204A-204M with corresponding antennas 202 in communication with the controller 144. For signal transmissions, the controller 144 directs a signal generator 216 to generate a pulse, sequence of pulses, or other signals. The output of the signal generator 216 is provided to a demultiplexer 218, which routes the output from the signal generator 216 to one of the transmitters 220A-220N. Meanwhile, raw signal data received via the receivers 204A-204M is stored in a data buffer 212. Thereafter, the data processing/communication unit 214 transmits the raw data to a surface communication interface 130 (see FIG. 1). The data processing/communication unit 214 also may process the raw data and transmit processed data to the surface communication interface 130 in addition to or instead of raw measurement data. Further, the data processing/communication unit 214 may select the types and amounts of raw data to be processed. Further, the data processing/communication unit 214 may select the types and amounts of raw data and/or processed data to be transmitted to the surface communication interface 130. For example, the data processing/communication unit 214 may selectively perform processing operations in accordance with various control parameters such as a multi-component synthesis parameter, a tilt angle synthesis parameter, a delayed virtual antenna parameter, a noise filtering parameter, a trigonometric fitting parameter, a temperature correction parameter, a software focusing parameter, a horn effect removal parameter, a borehole correction parameter, and a calibration parameter.

Example applications of the above parameters include setting a multi-component synthesis parameter to simulate transmitting and receiving antennas with different tilt angles based on the expected relative dip angle of the target formation layers. The delay amount or activation of delayed virtual antenna can be adjusted based on the desired depth of investigation or vertical resolution. Further, a noise filtering parameter can be turned on or off based on the noise level and a threshold. Further, a trigonometric fitting parameter may be applied to multiple bin data that is obtained from different rotation angles in a LWD system. Further, a temperature correction parameter may be applied if the temperature is outside the range of present calibration. Further, a polarization horn effect parameter may be applied if large peaks are observed in the apparent resistivity measurements.

Further, the data processing/communication unit 214 may perform processing operations in accordance with inversion parameters and visual representation parameters. Further, the data processing/communication unit 214 may perform processing operations in accordance with data quality parameters or rules. Further, the data processing/communication unit 214 may perform processing operations in accordance with the application of data filters (e.g., neural network or multi-dimensional interpolation/extrapolation operations) to raw measurement data or processed measurement data.

In some embodiments, the transmitters 220A-220N can act as receivers, and the receivers 204A-204M can act as transmitters. Thus, different modes of operation are possible. Also, signal multiplexing may be performed in time, frequency, or both. In frequency-based logging operations, a frequency signal is emitted, where the largest depth of detection is possible at very low frequencies. However, if very low frequencies are used, the signal may be too small. Conversely, if very high frequencies are used, the skin depth becomes very small, which leads to signal attenuation. Accordingly, the tool 140 may support operations at multiple frequencies and may adjust the frequency being used to ensure adequate performance over a range of resistivities.

In a time-based logging operation, many electromagnetic frequencies are emitted. Rather than sending narrow-band signals, broad-band signals (e.g., multitude periods of square pulses or other shapes) are transmitted. As an example, the signal generator 216 may feed a broad-band signal to one of the transmitters 220A-220N and respective antennas 222 to emit an electrical signal into the formation. In the formation, the electrical signal interacts with the properties of the formation (e.g., the resistivity or conductivity of the formation). An electrical signal modified by the formation is detected by the receiver antennas 202 and is conveyed to controller 144, data buffer 212, and data processing/communication unit 214. In accordance with some embodiments, an operator at the surface is able to monitor logging operations using visualization tools as described herein, and can make changes in the processing or in the data at the surface. An adaptive learning engine can also direct the logging tool 140 to adjust logging parameters or processing parameters for ongoing logging operations as described herein.

Figure 2B:
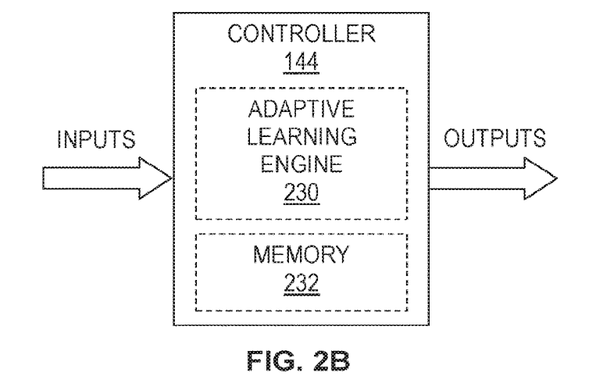
FIG. 2B shows an illustrative logging tool controller.

FIG. 2B shows an illustrative logging tool controller 144 for a downhole tool such as logging tool 140. In the embodiment of FIG. 2B, the controller 144 receives various inputs and generates various outputs. More specifically, in some embodiments, the controller 144 comprises an adaptive learning engine 230 that operates to initialize and/or select values for one or more logging workflow control parameters used during ongoing logging operations. For example, the adaptive learning engine 230 may initialize and/or select values for one or more logging workflow control parameters based on inputs such as measurement data, operator feedback, received rules, and/or learned rules. Thus, in at least some embodiments, the adaptive learning engine 230 corresponds to software or a programmable component that is disposed within the logging tool 140 or that is otherwise in situ with the logging tool 140. In alternative embodiments, portions of the adaptive learning engine 230 are distributed such that some operations of the adaptive learning engine 230 are performed downhole (within the logging tool 140) while other operations are performed at the surface (within surface computer 102). There are various known adaptive learning techniques that may be employed by the adaptive learning engine 230. Further, memory 232 may be employed to store values, received rules, learned rules, and/or other information utilized by the adaptive learning engine 230. For more information on adaptive learning systems, reference may be had to Neural and Adaptive Systems by José C. Principe et. al (2000), ISBN 0-471-35167-9.

Example adaptive learning engine rules include rules for selecting or adjusting logging control parameters, processing control parameters, and/or inversion control parameters according to predetermined programming, measurements, and/or triggers. In at least some embodiments, rules for the adaptive learning engine 230 are established using database information such as raw measurement data, processed measurement data, inverted measurement data, and/or visualization parameters. Further, manual feedback regarding the quality of raw measurement data, processed measurement data, inverted measurement data, and/or visualization parameters may be considered to establish rules for the adaptive learning engine 230. Further, a data filtration process such as a neural network procedure and/or multi-dimensional interpolation/extrapolation procedure may be applied to establish rules for the adaptive learning engine 230.

Figure 3:
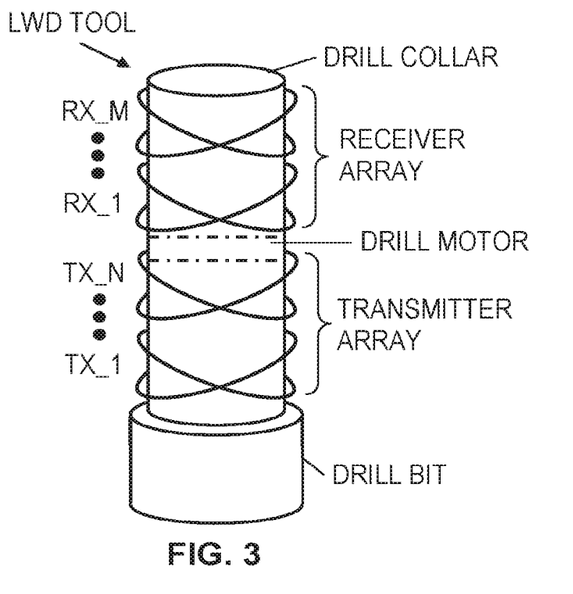
FIG. 3 shows components of a logging-while-drilling (LWD) tool embodiment.

FIG. 3 shows components of a LWD embodiment of the logging tool 140. As shown, the LWD tool of FIG. 3 includes a drill collar (mandrel), a drill motor, and a drill bit. The LWD tool also includes a receiver array (antennas RX_1 to RX_M) and a transmitter array (antennas TX_1 to TX_N). The receiver antennas and transmitter antennas may be grouped as shown or interspersed. Further, different antennas may be located around the drill collar and/or between the drill motor and the drill bit (placing antennas on a drill motor is difficult and is usually avoided). For LWD operations, measurements are often taken while the well is being drilled. Drilling can be stopped, however, to reduce the noise level and to make more sensitive measurements. Taking measurements while the drilling is stopped enables use of lower frequencies and provides more accurate measurements.

In at least some embodiments, as in FIG. 3, the drill motor does not include antennas. In such case, the spacing of transmitter and receiver antennas is limited. As an example, if the length of a drill motor is approximately 25 ft long, transmitters and receivers placed above and below the drill motor are separated by at least 25 ft. Further, use of a near-bit antenna (e.g., an antenna on the drill bit side of the drill motor) necessitates data transmissions from one side of the drill motor to the other side to recover data collected by the near-bit antenna. In such case, data transmission rates from the LWD tool to the surface are limited by the transmission rates to transfer data from the near-bit antenna to the other side of the drill motor where other communication electronics reside. Accordingly, the data encode/decode scheme for the LWD tool may be selected to account for the particular antenna arrangement (e.g., whether a near-bit antenna is used) and its corresponding data transmission rate issues.

Figure 4:
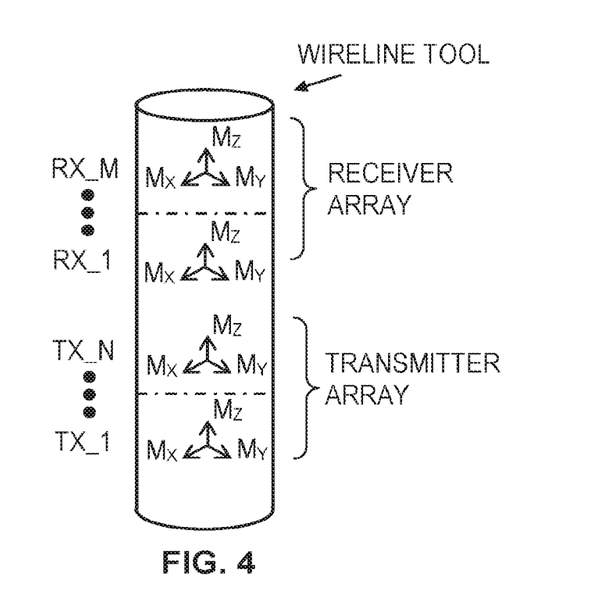
FIG. 4 shows components of a wireline tool embodiment.

FIG. 4 shows components of a wireline embodiment of the logging tool 140. In a wireline application, the well is already drilled, and may be filled with fluid. The tool is suspended with a wireline cable and is lowered into the well. In this case, the tool includes the transmitter array and receiver array with multicomponent antennas as shown in FIG. 4. The wireline embodiment does not contain as much metal as the LWD embodiment because there are no drilling forces. With less metal, the signal levels are improved which enables lower frequency logging operations. For example, the wireline tool can be made of fiberglass, which is electromagnetically transparent and, consequently, has little effect on the measurements.

Figure 5:
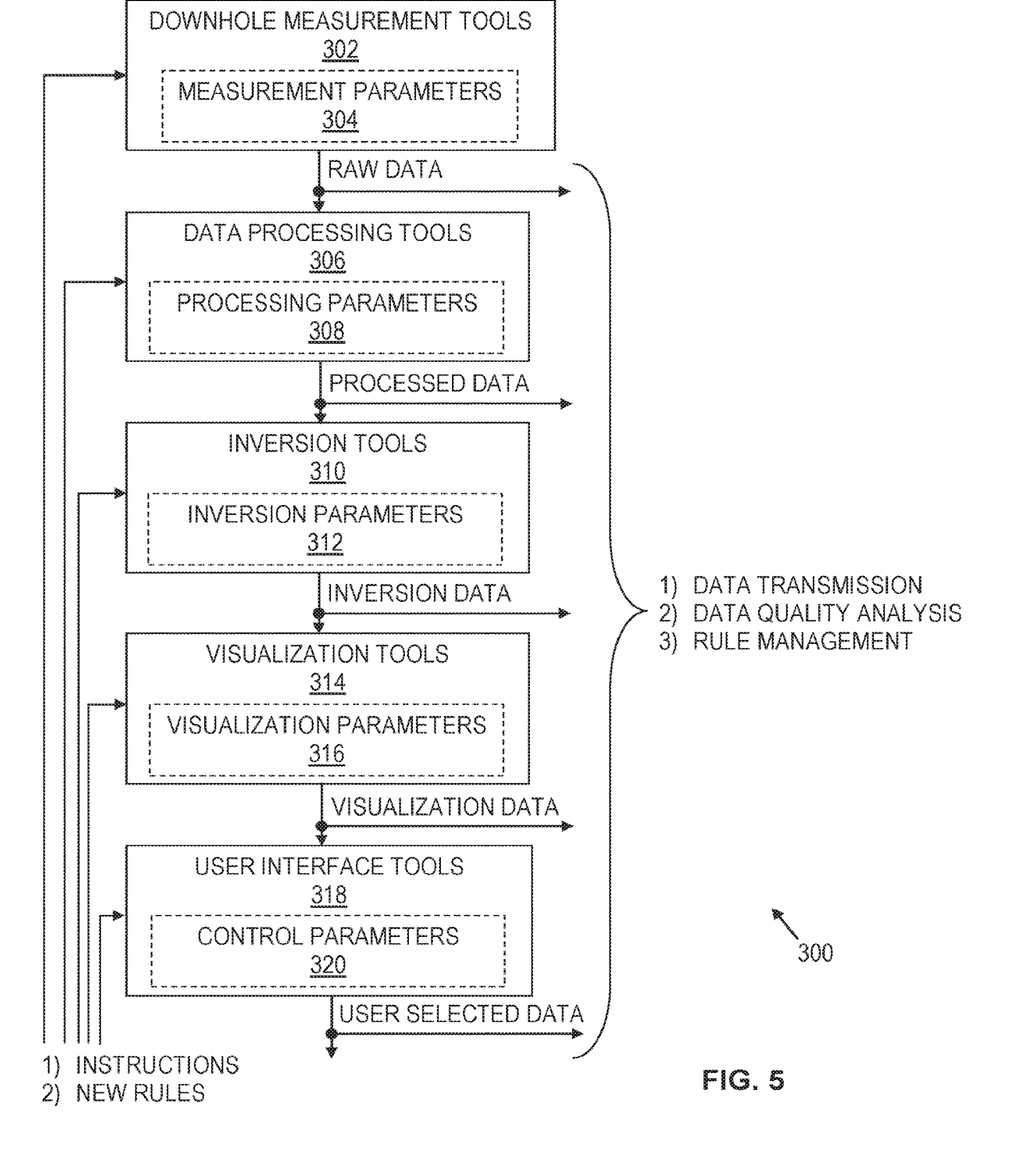
FIG. 5 shows a block diagram of an illustrative logging system elements related to logging workflow management.

FIG. 5 shows a block diagram of illustrative logging system elements related to logging workflow management operations as described herein. In FIG. 5, the various tools represent hardware, software, and/or other components to collect raw measurement data, to process the raw measurement data, to invert the processed data, to determine visualization data for a formation based on the collected measurements or inverted data, and to provide a user interface to enable user input as described herein. The various tools of FIG. 5 may be employed in a LWD tool, a wireline logging tool, a surface controller, and/or a surface computer.

More specifically, downhole measurement tools 302 with adjustable measurement parameters 304 collect and output raw data. Data processing tools 306 with adjustable processing parameters 308 process the raw data and output processed data. Inversion tools 310 with adjustable inversion parameters 312 invert the processed data and output inverted data. Visualization tools 314 with adjustable visualization parameters 316 determine visualization data using the inverted data and output the visualization data. User interface tools 318 with adjustable control parameters 320 display a formation map view based on the visualization data, and enable an operator to provide user unit. The user interface tools 318 output user selected data.

In at least some embodiments, the raw data, the processed data, the inversion data, the visualization data, and/or the user selected data is available for data transmission operations, data quality analysis operations, and rule management operations. Further, the raw data, the processed data, the inversion data, the visualization data, and/or the user selected data may result in instructions and/or new rules being provided to the downhole measurement tools 302, the data processing tools 306, the inversion tools 310, the visualization tools 314, and/or the user interface tools 318 for ongoing logging operations. In at least some embodiments, the downhole measurement tools 302, the data processing tools 306, the inversion tools 310, and/or the other tools of FIG. 5 are at least in part controlled by logging workflow control parameters selected by an adaptive learning engine as described herein.

Figures 6, 7:
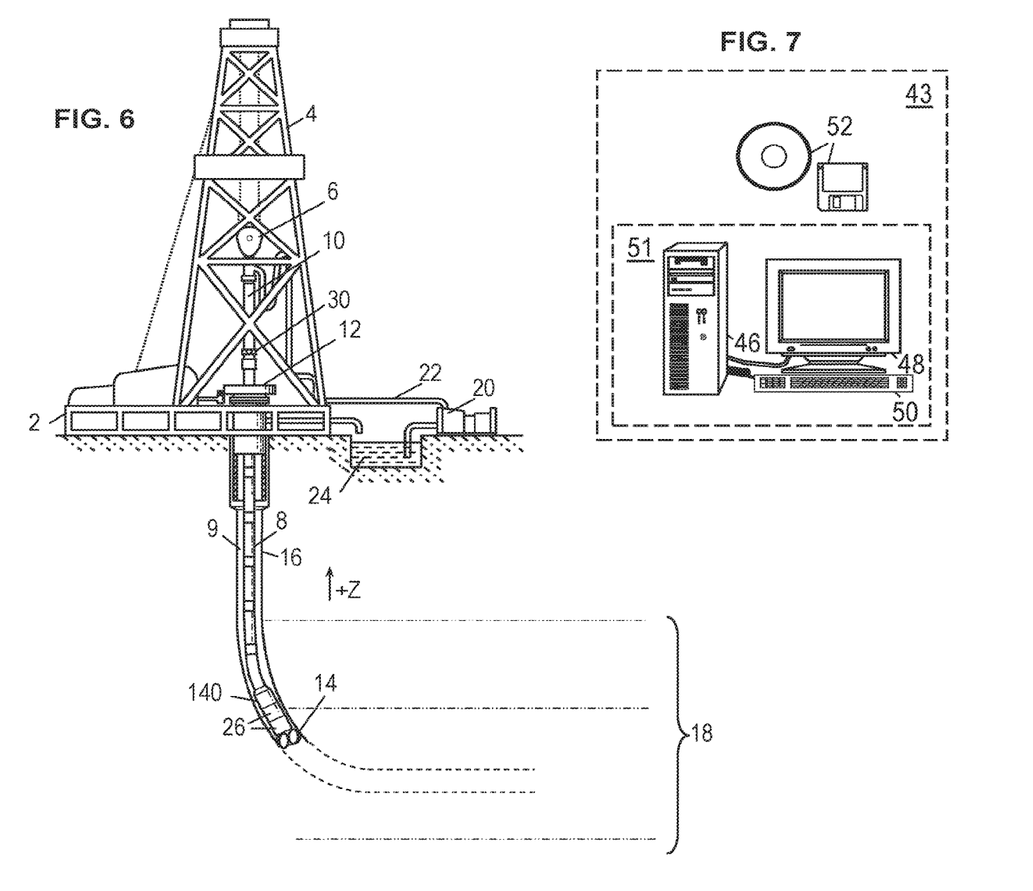
FIG. 6 shows an illustrative LWD environment.
FIG. 7 shows a block diagram of an illustrative computer system.

Representatively and schematically illustrated in FIG. 6 is a LWD environment. In FIG. 6, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus 9 around drill string 8, and into a retention pit 24. The drilling fluid transports cuttings from the borehole 16 into the pit 24 and aids in maintaining the integrity of the borehole 16. Depending on the job requirements, the drilling fluid may be oil-based (with a high resistivity) or water-based (with a low resistivity).

The drill bit 14 is just one piece of an open-hole LWD assembly that includes one or more drill collars 26 and logging tool 140. Drill collars 26 are thick-walled steel pipe sections that provide weight and rigidity for the drilling process. The logging tool 140 (which may be built into the drill collars) gather measurements of various drilling or formation parameters. As an example, logging instrument 140 may be integrated into the bottom-hole assembly near the bit 14 to collect look-ahead and/or look around measurements. The collected measurements may be plotted and used for steering the drill string 8.

Measurements from the logging tool 140 can be acquired by a telemetry sub (e.g., built in to logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used.

In accordance with at least some embodiments, measurements collected from the logging tool 140 are processed by a computer system executing a logging workflow management software tool with various options as described herein. FIG. 7 shows an illustrative computer system 43 for managing logging workflow operations and/or steering operations. The computer system 43 may correspond to, e.g., an onsite logging facility for the LWD system of FIG. 6, a remote computing system that receives logging measurements from such logging facilities, or surface computer 102 (see FIG. 1). The computer system 43 may include wired or wireless communication interfaces receiving such logging measurements. As shown, the illustrative computer system 43 comprises user workstation 51 with a computer chassis 46 coupled to a display device 48 and a user input device 50. The display device 48 and user input device 50 enable an operator, for example, to interact with the workflow management software 110 (e.g., the visualization features and user interfaces) and or other software executed by the workstation 51. The computer chassis 46 includes one or more information storage devices 52 (shown in FIG. 7 in the form of removable, non-transitory information storage media) for accessing software such as the workflow management software 110. Such software may also be downloadable software accessed through a network (e.g., via the Internet).

Figures 8, 10:
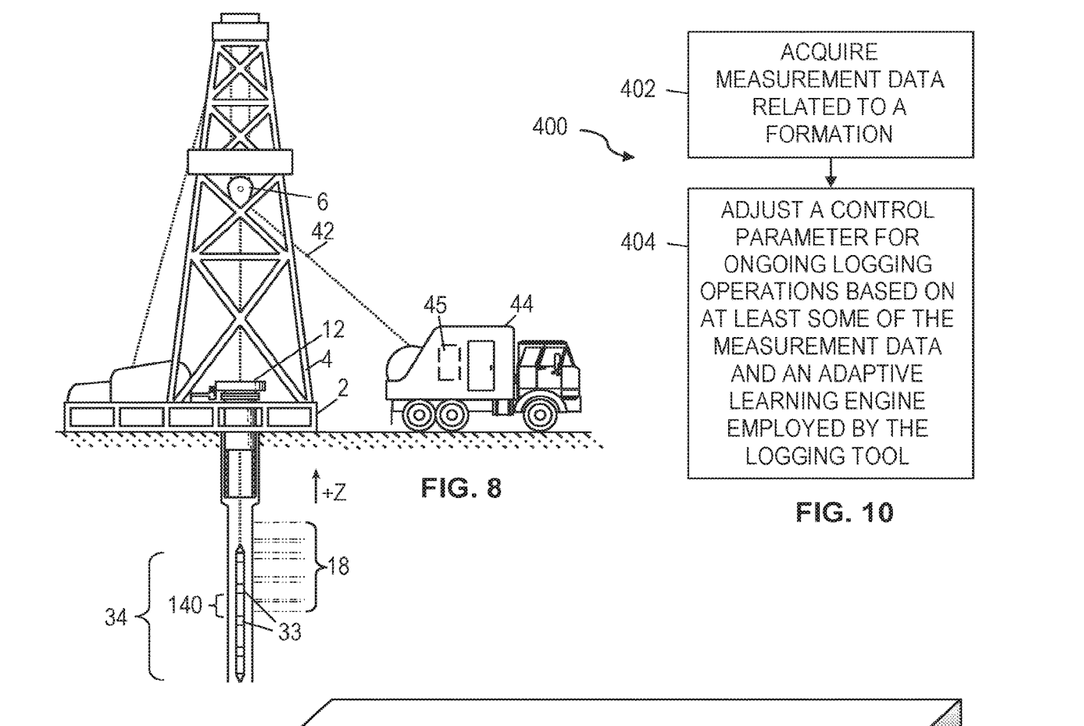
FIG. 8 shows an illustrative wireline logging environment.
FIGS. 10-12 are flowcharts of illustrative workflow adjustment methods for ongoing logging operations.

At various times during the drilling process, the drill string 8 shown in FIG. 6 may be removed from the borehole 16. Once the drill string 8 has been removed, as shown in FIG. 8, logging operations can be conducted using a wireline logging string 34 (i.e., an assembly of wireline logging tools suspended by a cable 42 having conductors for transporting power to the tools and telemetry from the tools to the surface). It should be noted that various types of formation property sensors can be included within the wireline logging sonde 34. As shown, the illustrative wireline logging sonde 34 includes logging tool 140, which may perform and/or respond to the logging workflow management operations described herein. The logging tool 140 may be coupled to other modules of wireline logging string 34 by one or more adaptors 33.

In FIG. 8, a wireline logging facility 44 collects measurements from the logging tool 140, and includes computing facilities 45 for managing logging operations, acquiring and storing the measurements gathered by the wireline logging sonde 34, and processing the measurements for display to an operator. The computing facilities 45 may correspond to surface computer 102 or another computer that executes the workflow management software 110 and enables an operator to interact with the visualization features and user interfaces described herein. For example, in response to visualization of measured parameters, an operator may use computing facilities 45 to manually adjust logging workflow features applied to the logging tool 140, or to provide input applied to the adaptive learning engine 230.

Figure 9:
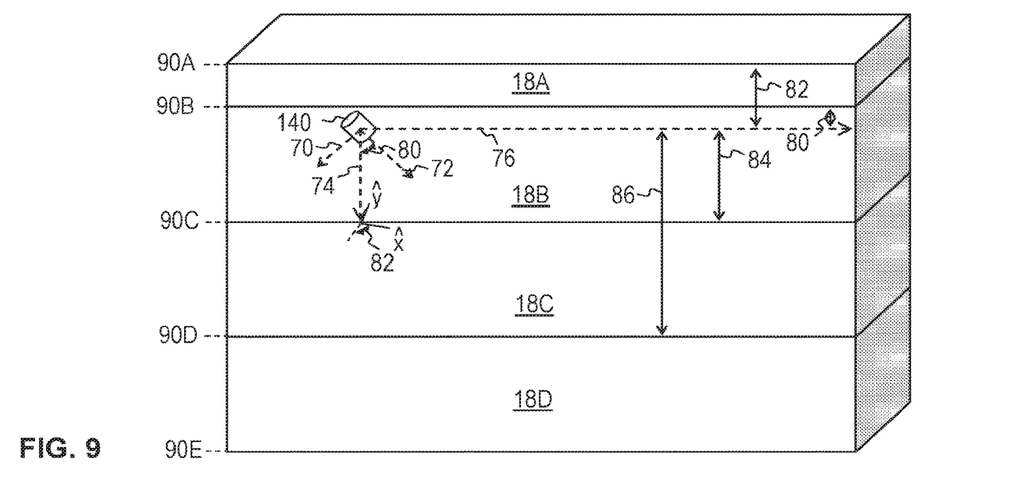
FIG. 9 shows various parameters of interest for a logging tool in a subterranean environment.

FIG. 9 shows an illustration of the logging tool 140 in a subterranean environment with multiple formation beds or layers 18A-18D and bed boundaries 90A-90E. Although the formation beds 18A-18D and bed boundaries 90A-90E are represented as a two-dimensional (2D) image with straight lines, it should be understood that subterranean environments often have sloped or curved formation beds and bed boundaries.

In FIG. 9, various direction arrows are shown. Arrow 70 represents the direction to the side of the logging tool 140 extending radially outward, arrow 72 represents the direction ahead of the logging tool 140, arrow 74 represents a true vertical direction extending downward from the logging tool 140, and arrow 76 represents a true horizontal direction extending sideways from the logging tool 140. Various angles are also shown in FIG. 9, including angle 80, which corresponds to the relative dip of logging tool 140 (i.e., the angle between arrow 74 and arrow 72), and angle 82, which corresponds to the azimuth for bed boundary 90C with respect to a tool azimuth reference point.

Also shown in FIG. 9 are various arrows to indicate the vertical distance between the logging tool 140 and different bed boundaries. More specifically, arrow 80 represents the vertical distance between logging tool 140 and bed boundary 90B, arrow 82 represents the vertical distance between logging tool 140 and bed boundary 90A, arrow 84 represents the vertical distance between logging tool 140 and bed boundary 90C, and arrow 86 represents the vertical distance between logging tool 140 and bed boundary 90D.

In accordance with some embodiments, distance information and angle information such as the distances and angles described in FIG. 9 are plotted or mapped by visualization software (e.g., the visualization control module 118) that receives look-around or look-ahead measurements. Without limitation, the parameters that are displayed or represented by visualization software may include physical parameters such as tool orientation, formation resistivity values, vertical resistivity, horizontal resistivity, relative dip angles, relative azimuth angles, bed dips, bed azimuths, drill path, distance to bed boundaries, water saturation, and formation porosity. In addition, trust values such as uncertainty estimates, inversion type information, and/or comparison information may be displayed or represented by visualization software. By displaying or representing physical values and trust values, visualization software enables an operator to make steering decisions for an LWD tool, to adjust control parameters for ongoing logging operations, and/or to assist with establishing adaptive learning engine rules for ongoing logging operations as described herein.

FIG. 10 shows a flowchart of an illustrative workflow adjustment method 400 for ongoing logging operations. The method 400 may be performed, for example, by surface computer 102 (representative also of computer system 43 and/or computing facilities 45) and/or controller 144. As shown, the method 400 includes acquiring measurement data related to a formation from a logging tool (block 402). At block 404, a control parameter for ongoing logging operations is adjusted based at least in part on the acquired measurement data and an adaptive learning engine employed by the logging tool. As an example, adjusting the control parameter at block 404 may correspond to adjusting a movement rate of the logging tool. As another example, adjusting the control parameter at block 404 may correspond to adjusting a logging control parameter such as a source signal power level, a source signal frequency, an averaging window length, a synthetic antenna orientation, a phase shift, and/or an inversion parameter. As another example, adjusting the control parameter at block 404 may correspond to adjusting a logging control parameter such as a logging frequency set, a transmitter set, a receiver set, and/or an initial guess value. As another example, adjusting the control parameter at block 404 may correspond to adjusting a processing control parameter such as a multi-component synthesis parameter, a tilt angle synthesis parameter, and/or a delayed virtual antenna parameter. As another example, adjusting the control parameter at block 404 may correspond to adjusting a processing control parameter such as noise filtering parameter, a trigonometric fitting parameter, a temperature correction parameter, a software focusing parameter, a horn effect removal parameter, a borehole correction parameter, and/or a calibration parameter.

In some embodiments, the method 400 includes additional steps. For example, the method 400 may include the step of storing raw data, processed signals, logging parameters, inversion parameters, and visual representation parameters in a database and evaluating information stored in the database to determine rules for the adaptive learning engine. As another example, the method 400 may include the steps of receiving a data quality evaluation from an operator for at least some available raw data, processed data, logging parameters, inversion parameters, and visual representation parameters, and using the data quality evaluation to determine adaptive learning engine rules. As another example, the method 400 may include the step of applying a filter to information stored in the database, where the filter applies neural network or multi-dimensional interpolation/extrapolation operations. Further, the method 400 may include the step of selecting inputs to and/or rules for an adaptive learning engine of the logging tool based at least in part on a visual representation of a formation.

In some embodiments, the method 400 includes additional steps for managing data transmission limitations. For example, the method 400 may include an adaptive learning engine adjusting how much of multiples types of collected data are transmitted from the logging tool to a surface computer during ongoing logging operations. As another example, the method 400 may an adaptive learning engine adjusting an encode/decode format for data transmitted from the logging tool to the surface computer during ongoing logging operations. As another example, the method 400 may include an adaptive learning engine adjusting how much processing of multiples types of collected data to perform and to adjust how much of multiple types of processed data are transmitted from the logging tool to the surface computer during ongoing logging operations.

In some embodiments, an operator may temporarily or permanently override previously received rules or learned behavior of an adaptive learning engine. In other words, an operator may explicitly direct a logging tool to provide any of the disclosed control parameters and/or to perform any of the disclosed logging workflow operations. It should be understood, however, that an operator and adaptive learning engine can co-exist. For example, in some embodiments, certain control parameters and/or operations are selected by an operator, while others are selected by an adaptive learning engine.

Figure 11:
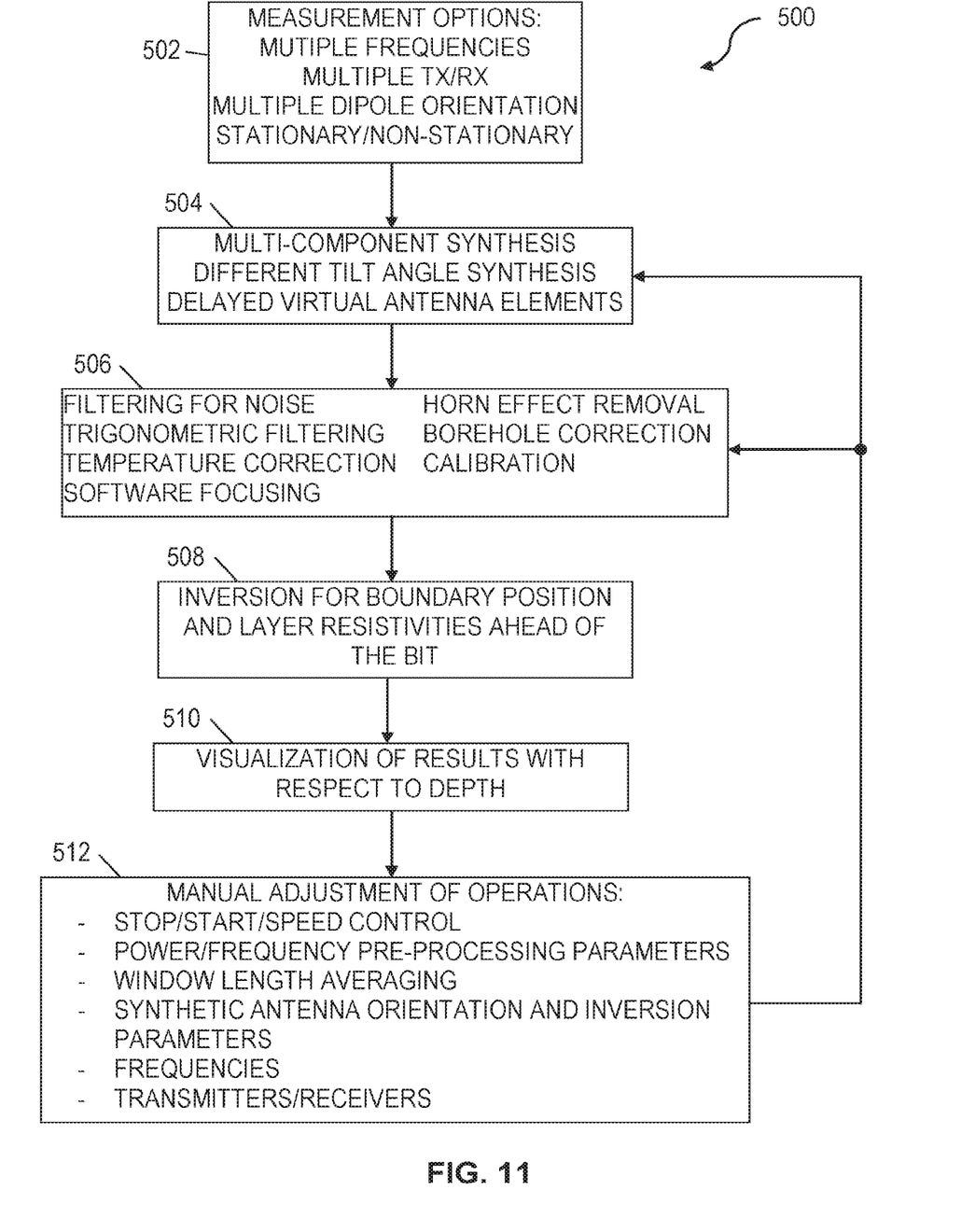

FIG. 11 shows another illustrative workflow adjustment method 500 for ongoing logging operations. The method 500 may be performed, for example, by surface computer 102 (representative also of computer system 43 and/or computing facilities 45) and/or controller 144. It should be understood that, in different embodiments, the ordering of steps in method 500 may vary, and that steps may be omitted. At block 502, signals are received at multiple frequencies, and with multiple transmitter/receiver combinations (sometimes referred to as channels). Multiple antenna orientations can also be employed when receiving signals. With a LWD tool, the measurements are taken as the tool rotates, which enables multiple measurements to be made at different rotation angles. If the tools have azimuthal sensitivity, such as a tilted antenna, coil, or X or Y (radially oriented) directed inductive coils, then different rotation angles will provide different information (e.g., multiple dipole orientations). In addition, LWD measurements can be made either while drilling, or while drilling has been stopped.

After accumulating data at block 502, the data is processed at block 504. In at least some embodiments, the processing step of block 504 includes performing multi-component synthesis. In multi-component synthesis, information from measurements that were made in different orientations and/or different dipole orientation is combined to create synthetic data which emulates a multi-component tool. The processing step of block 504 also may include performing different tilt angle synthesis. In this process, measurements that were taken with certain tilt angles on the transmitting or receiving antenna can be processed to obtain a different synthesized tilt angle. This process uses a combination of two or more linearly independent antennas to provide a desired orientation. With a crossed antenna combination, for example, the results can be added to obtain the Z-directed component or can be subtracted to obtain the radial component. Different tilt angles can be obtained, depending on how the antenna signals are processed.

The processing step of block 504 also may include performing delayed virtual antenna element operations. With this option, measurements are taken at a specific depth, and then the logging tool is moved. After the logging tool is moved, additional measurements are taken at a different depth. The two measurements are then combined and treated as if performed at the same time. In this process, a transmitter antenna is sometimes used at one depth, and is later used as a receiver antenna at the other depth. In this manner, logging configurations are synthesized that are otherwise not possible at one depth.

Further processing of data may occur at block 506. For example, the processing step of block 506 may include filtering for noise, which makes it possible to remove horn effects and to perform trigonometric fitting. When data is received from different rotation angles with LWD tools, the data received at each signal shows up as a combination of sinusoidal signals. If a number of different rotation angles are available and data is collected from different rotation angles a large amount of data is generated. For example, if 32 bins of rotation angles are used, there will be 32 numbers to transmit uphole. Because of this large volume of information, a reduction of the amount of data to be handled or transmitted may be preferred. In addition, different bins may include some noise in the data. This problem can be addressed by fitting a sinusoidal function to the data in different bins because it is known a priori that it should be like a sinusoid. When a sinusoid is fit to this data, then only one number is transmitted uphole. This function thus reduces the amount of data to be transmitted uphole because all of these bins are reduced to just one number or two numbers (e.g., sinusoid amplitude and phase values). Trigonometric filtering enables the total amount of data to be reduced, which makes it easier to process, to transmit, and to perform noise reduction.

In at least some embodiments, the step of block 506 also may include performing inversion processing to correct borehole effects. For example, if the amount of resistivity of a fluid is known (e.g., because a known fluid is being pumped or because the resistivity of cuttings and mud is measured) and the borehole size is known (e.g., by measuring the borehole size with calipers), this information can be used to correct for borehole effects.

In at least some embodiments, the step of block 506 also may include performing temperature corrections. For example, correction tables may be calibrated using a calibration procedure, which is performed uphole. For the calibration procedure, a section of the tool is placed in an oven and heated to obtain its temperature characteristic. The temperature characteristic is fitted to a polynomial and is subsequently used downhole. Even with a temperature sensor, downhole temperature information may need to be corrected using such correction tables. Another way of performing the temperature calibration is to use a compensated ratio of multiple receivers and multiple transmitters.

In at least some embodiments, the step of block 506 also may include performing software focusing, which is a procedure that uses multiple measurements at different depths. These different measurements are combined with different depths of investigation and different vertical resolutions to derive a scientific measurement of a desired depth of investigation and/or vertical resolution. This process enables different measurements and characteristics to be combined to obtain a new measurement with preferred characteristics.

At block 508, inversion operations are performed. For example, the inversion may be performed for the boundary position and the resistivities ahead of the point of reference (e.g., the bit or other point of reference on a logging tool). The results are then visualized at block 510 with respect to depth to determine data trends. The step of block 510, for example, results is a visual representation of a formation for different frequencies, for multiple transmitters and receivers, and/or for multiple rotation angles. While processing data, multiple results can be obtained. Some of these results will be more reliable than others, based on the conditions. The operator performing the manual inversion processing can review the results and determine which are the most accurate, based on experience and conditions.

At block 512, an operator reviews the results and can adjust several logging options based on the review. For example, the operator may adjust the drilling operation parameters. More specifically, if the measurement was not stationary, the operator can make it stationary to obtain better results. Further, the operator can lower the rotation speed and can switch to different power levels if the signal levels seem to be too low or if the results are bad because of the signal level. The operator can also switch between different frequencies. For example, an operator can switch to lower frequencies to improve the results. In addition, the operator can change processing parameters, which feeds back to the blocks 504, 506, and 508. For example, the operator can change how multi-component processing is performed by changing the resistivity tensor ratios that are being used. Further, an operator can change the average window length if there is any noise which can be fixed via filtering. Further, the operator can change inversion inputs such as receiver and transmitter antennas used and also tensor components or tilt angles. Further, the operator can modify the initial guess to obtain better results if the operator has an idea of what to expect. The operator also may determine a number of iterations to be performed until satisfactory initial results are developed.

Figure 12:
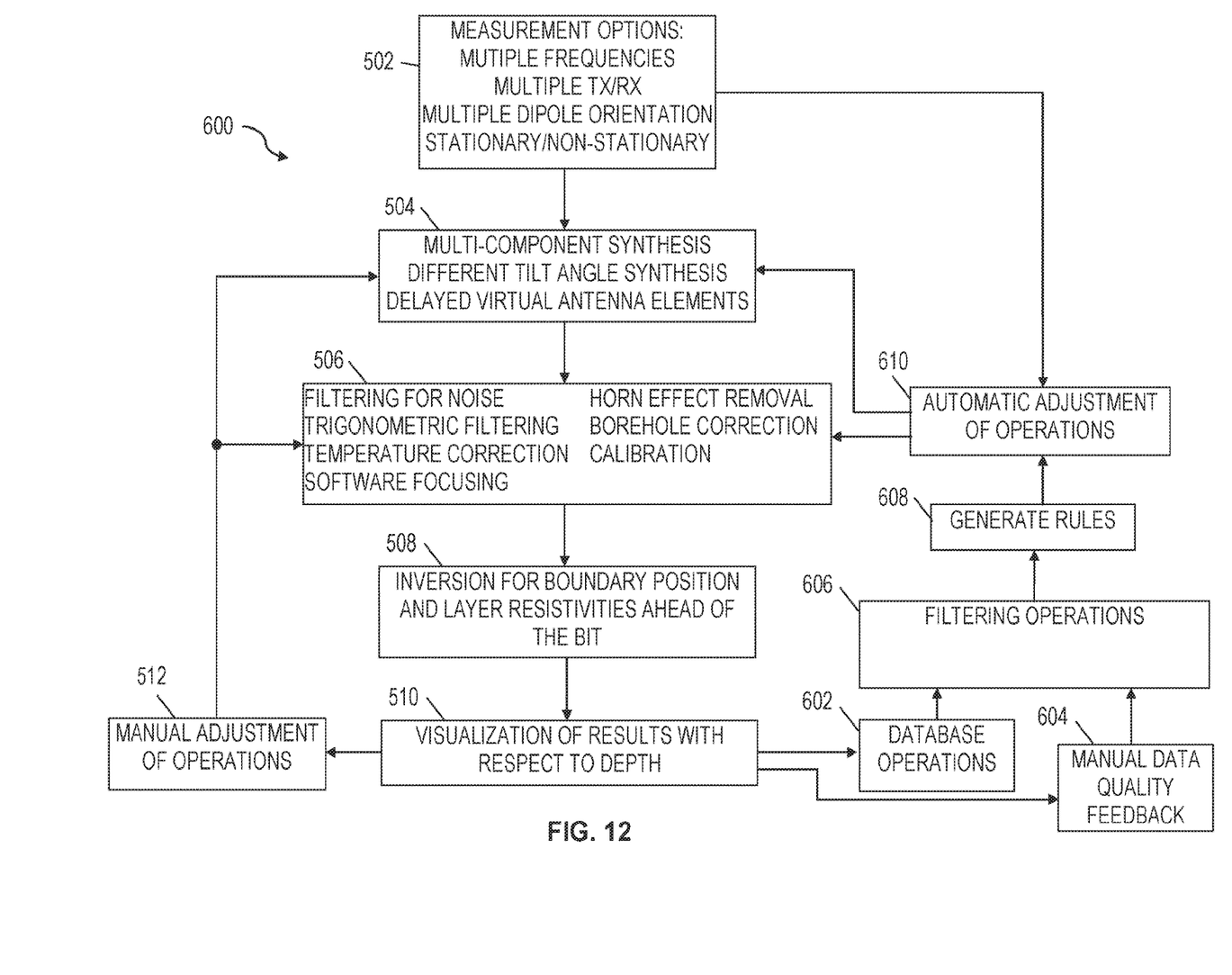

FIG. 12 shows another illustrative workflow adjustment method 600 for ongoing logging operations. The method 600 may be performed, for example, by surface computer 102 (representative also of computer system 43 and/or computing facilities 45) and/or controller 144. In method 600, the steps of method 500 are performed. In addition, the method 600 enables automatic adjustment of logging, processing, inversion and/or visualization operations at block 610. For example, adaptive learning engine programming may be stored on hardware or software and used downhole to enable such automation. With such programming, data can more efficiently be collected, processed, and transmitted to the surface without user intervention. For example, adaptive learning engine programming can select the next best frequency to use based on the current signal levels received at the current frequency. As another example, adaptive learning engine programming can select the synthetic antenna tilt angles to minimize undesired signals, while optimizing for the signal from the layers ahead of the bit. As another example, adaptive learning engine programming can discard bad data points that are affected by noise and apply the inversion only based on the good data points. As another example, adaptive learning engine programming can adjust logging parameters that are associated with telemetry, such as which data will be sent to the surface. This can help optimize the communication bandwidth while providing the most relevant results to the operator.

In at least some embodiments, such adaptive learning engine programming and the related adjustments of block 610 are based on a set of rules that define control parameter values applied to any given signal or past inversion results. In method 600, such rules are generated at block 608. Without limitation, these rules may be based on filtering operations performed at block 606. For example, the filtering operations may apply ranges such as minimum and a maximum values, or may apply more complicated decision-making algorithms such as neural-networks, look-up tables, or multi-dimensional interpolation/extrapolation. In some embodiments, the rules and associated parameters are updated during ongoing logging operations or after logging operations are complete via a machine-learning process or a statistical study of the data, which includes the signals received, parameters chosen, inversion results obtained, and/or data quality feedback from an operator.

In some embodiments, the filtering operations of block 606 rely on information from database operations at block 602 and manual data quality feedback at block 604. To perform the database operations of block 602, data is gathered into a large database that includes many (e.g., all available) measurement points and many (e.g., all available) jobs in a given geological area. Multiple geological areas can be included to improve adaptability. The database operations of block 602 help determine the highest quality inversion results for any given signal. In some embodiments, the amount of data provided to the machine-learning system is increased using manual data quality feedback of logging, inversion, and/or visualization parameters at block 604 (such manual feedback provides additional sample points for machine-learning operations). In some embodiments, automated workflow or adaptive learning management as in method 600 may be dynamically enabled or disabled based on user input. Further, the steps for automated workflow management may vary based on user input. For conditions that are new compared to those that exist in the database, the manual feedback of block 604 is more relevant and may receive higher priority than adjustments suggested by the database operations of block 602.

It is also possible to simplify the learning and rule application process by first selecting the signals in the database that are closest to the received signal, and then applying the parameters that are provided and marked as best by the operator, if any exist. Also, the operator may perform a manual search on the parameters to achieve the best inversion and provide feedback on the results that are obtained in the process, to assist with improvement of the database operations of block 602. Such feedback would involve review of multiple database entries with the same set of data, but different processing and visualization parameters, and providing feedback on the quality of each associated result.

In at least some embodiments, the database, automation rules, and/or adjustment algorithm reside in the downhole system and the manual feedback is provided from the surface to the downhole system via downhole communications. In another embodiment, the database and the learning system reside at the surface, but the rules reside downhole. Thus, different embodiments may vary with regard to the amount of downhole communications and uphole communication needed for logging workflow management operations. In another embodiment, user feedback is only provided in terms of corrective action such as selecting the best parameters to use for the previous set of data. In this case, learning occurs based on a quality factor that is derived on the difference between the parameters that the automatic adjustment system outputs and the parameters that the operator communicates as the best.

The various embodiments of the present disclosure described above may be utilized with various types of look-ahead or look-around measurements without departing from the principles of this disclosure. Further, the disclosed logging workflow management options are merely examples, and do not limit embodiments to any specific detail given. Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of the present disclosure.

What is claimed is:

1. A method of automatic adjustment of logging, processing, inversion, and visualization operations, the method comprising:
   gathering data about formation properties in a database that includes a plurality of in-well measurement points and a plurality of wells in a given geological area;
   filtering the gathered data;
   generating rules based on the filtered data; and
   providing automatic adjustments to automatically adjust the logging, processing, inversion, and visualization operations, wherein:
      a quality factor is derived based on a difference between the automatic adjustments and parameters that an operator communicates as a best parameter,
      using the quality factor to determine which of the gathered data is to be stored in the database,
      applying the rules to a next iteration of data that is to be gathered, and
      repeating until no further improvement is obtained.

2. The method of claim 1 wherein the automatic adjustments are selected from the group consisting of:
   selecting a synthetic antenna tilt angle to minimize undesired signals while optimizing for signal from layers ahead of a bit;
   adjusting drilling speed or mud weight;
   adjusting a power level at a particular frequency;
   adjusting a source signal frequency used for a logging operation;
   adjusting a time duration of measurement;
   discarding bad data points that are affected by noise; and
   applying the inversion operation based on the stored data.

3. The method of claim 2 wherein the automatic adjustment to drilling speed or mud weight is adjusted in response to a determination that a resistivity of a formation layer is smaller than a threshold.

4. The method of claim 2 wherein the automatic adjustment to the power level at a particular frequency is increased in response to a determination that an inversion quality at the particular frequency is below a threshold level.

5. The method of claim 2 wherein the automatic adjustment to the source signal frequency used for a logging operation is reduced in response to a determination that an inverted bed resistivity is below a threshold level.

6. The method of claim 5 wherein the automatic adjustment to the source signal frequency used for a logging operation is increased in response to a determination that an inverted bed resistivity is above the threshold level.

7. The method of claim 2 wherein the automatic adjustment to the time duration of the measurement is increased in response to a determination that noise level is above a threshold level.

8. The method of claim 2 wherein the automatic adjustment to the synthetic antenna tilt is based on a determination of a formation dip angle or tool orientation.

9. The method of claim 1 in which at least some of the rules that are to be applied to the next iteration of data that is to be gathered are applied to a multi-component synthesis in which information from measurements that were made in different tool orientations and/or different dipole orientations is combined to create synthetic data which emulates a multi-component tool.

10. The method of claim 1 in which at least some of the rules that are to be applied to the next iteration of data that is to be gathered are applied to at least one of the group consisting of:
noise filtering,
temperature correction,
software focusing, and
borehole correction or calibration.

11. The method of claim 1 in which the rules that are to be applied to the next iteration of the data that is to be gathered are also fed into an adaptive learning routine that automatically adjusts operating parameters when new measurement data are to be acquired.

12. The method of claim 1 wherein the database, filtering, rules generation, and automatic adjustment reside in a downhole system and the operator feedback is communicated from a surface to the downhole system.

13. The method of claim 1 wherein the database, filtering, and automatic adjustment reside at a surface and the rules generation resides in a downhole system.

* * * * *